United States Patent [19]

Bening et al.

[11] Patent Number: 5,356,974

[45] Date of Patent: Oct. 18, 1994

[54] HYDROXYL FUNCTIONAL DERIVATIVES OF EPOXIDIZED DIENE BLOCK COPOLYMERS AND PROCESS FOR MAKING THEM (II)

[75] Inventors: Robert C. Bening; James R. Erickson, both of Katy; David J. St. Clair; Carma J. Gibler, both of Houston; Joe J. Flores, Sugarland, all of Tex.

[73] Assignee: Shell Oil Company, Houston, Tex.

[21] Appl. No.: 217,472

[22] Filed: Mar. 24, 1994

Related U.S. Application Data

[62] Division of Ser. No. 863,648, Apr. 3, 1992, Pat. No. 5,300,586.

[51] Int. Cl.$^5$ .................................. C08F 8/00
[52] U.S. Cl. ........................... 525/332.8; 525/332.9; 525/333.1; 525/332.2; 525/355
[58] Field of Search ............ 525/332.8, 332.9, 333.1, 525/333.2

[56] References Cited

U.S. PATENT DOCUMENTS

| | | |
|---|---|---|
| 3,135,716 | 6/1964 | Uraneck et al. . |
| 3,555,112 | 1/1971 | Winkler . |
| 3,607,977 | 9/1971 | Taylor et al. . |
| 3,607,982 | 9/1971 | Winkler et al. . |
| 3,700,748 | 10/1972 | Winkler . |
| 3,714,297 | 1/1973 | Blaise et al. . |
| 4,051,199 | 9/1977 | Udipi et al. . |
| 4,237,245 | 2/1980 | Halasa et al. . |
| 4,851,476 | 7/1989 | Willis . |
| 5,002,676 | 3/1991 | Willis et al. . |

FOREIGN PATENT DOCUMENTS

| | | |
|---|---|---|
| 0387947 | 9/1990 | European Pat. Off. . |
| 0441485A2 | 8/1992 | European Pat. Off. . |
| 0396780A1 | 1/1994 | European Pat. Off. . |
| 90/08787 | 8/1990 | World Int. Prop. O. . |

*Primary Examiner*—Bernard Lipman
*Attorney, Agent, or Firm*—Donald F. Haas

[57] ABSTRACT

A process for making polymers of conjugated dienes which contain hydroxyl groups in the diene blocks which comprises (a) making a precursor polymer by polymerizing at least one conjugated diene which leaves 1,2 disubstituted, 1,1 disubstituted, 1,1,2 trisubstituted or tetrasubstituted olefinic unsaturation in the polymer, (b) optionally partially hydrogenating said precursor polymer, (c) epoxidizing said precursor polymer such that epoxy groups form at said substituted sites and the amount of epoxy functionality in the polymer is from 0.1 to 5 Meq/g polymer, and (d) reacting the epoxidized polymer with an alcohol solution of hydrochloric acid.

A diene polymer containing 0.1 to 10 Meq/g polymer of hydroxyl group and comprised of alcohol units of the formula

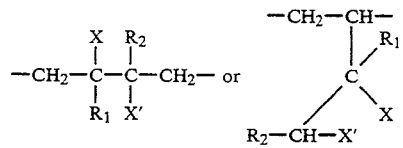

where $R_1$ and $R_2$ are hydrogen or alkyl radicals and X and X' are either —OH or —Cl and at least one of them is —OH.

3 Claims, No Drawings

HYDROXYL FUNCTIONAL DERIVATIVES OF EPOXIDIZED DIENE BLOCK COPOLYMERS AND PROCESS FOR MAKING THEM (II)

This is a division of application Ser. No. 07/863,648, filed Apr. 3, 1992 now U.S. Pat. No. 5,300,586.

BACKGROUND OF THE INVENTION

This invention relates to elastomeric block polymers of conjugated dienes which contain alcohol units in the diene blocks. The invention also relates to a process for making such polymers from epoxidized diene block polymers.

Conventional A-B-A block copolymers are known to be useful in coatings, sealants, adhesives and modified asphalts but their usefulness in such products is not as great as it could be if these polymers did not suffer from deficiencies in certain physical properties. For instance, U.S. Pat. No. 3,792,005 disclosed that coatings can be made using block polymers of A-B-A type where A is a monovinyl aromatic polymer block, usually polystyrene (S), and B is a rubber polymer block, usually hydrogenated polybutadiene (EB) or hydrogenated polyisoprene (EP). These polymers could be specially useful in elastomeric coatings because they can be formulated to have good flexibility and therefore, will not crack during thermal cycling, an important requirement for roof coatings, for example, or during metal forming, where the coating becomes stretched as the metal is bent. However, coatings based on conventional A-B-A type block copolymers are deficient in that they lack strong adhesion and in applications in which the coating will contact organic liquids such as gasoline, or high temperatures; the coatings merely dissolve or melt off of the substrate.

It would be advantageous to provide block polymers of this type which had enhanced physical properties. By functionalizing these conventional block polymers, they can be crosslinked to give polyurethane structures which will have better physical properties and thus be more useful than the conventional block polymers in many coatings, sealants, adhesives and modified asphalts.

The known curable or crosslinked coatings which are based on vinyl aromatics and conjugated diolefins do not have particularly good long term heat, weather and ultraviolet stability due to the need to utilize unhydrogenated polymers (it is difficult to add functional groups without using unhydrogenated polymers). Hydrogenation is known to improve long term heat, weather and ultraviolet stability, but it removes the double bonds which are needed to add functional groups which can be crosslinked.

It is an object of the present invention to provide a block polymer which can be modified so that it is substantially free of residual olefinic double bonds and can be crosslinked by reaction with amino resins and isocyanates. Further, it is an object of this invention to provide a coating composition which is based on this crosslinkable block polymer.

It is also an object of the present invention to provide a process for making such block polymers which achieves high conversion in relatively short reaction time to a well defined product under mild conditions. In the past, strong mineral acids, such as perchloric acid, have been used to react epoxidized polymers such as disclosed in U.S. Pat. Nos. 3,555,112, 3,607,977 and 3,607,982. However, perchloric acid is undesirable because it forms explosive compounds. Special facilities must be provided to handle the acid in its concentrated form. The reaction times required to achieve reasonable conversion also tend to be relatively long (the examples specify reaction times on the order of six hours). These examples are also limited to polymers which possess high levels of epoxy functionality. It is not obvious that these conditions could result in substantial amounts of alcohol functionality when applied to polymers possessing relatively low levels of epoxy functionality. Gel formation (crosslinking), inefficient conversion to the alcohol and discoloration have been a problem in systems using sulfuric acid as the catalyst. It would be advantageous to provide a process for making hydroxyl functional derivatives of epoxidized diene block polymers under mild conditions which avoid these problems.

It would also be advantageous for this process to result in substantial conversion at reaction times on the order of one hour. Further, it would be advantageous to demonstrate that these conditions are applicable to hydrogenated diene block copolymers which contain low levels of primarily highly-substituted (tri- and tetraalkyl substituted) epoxy groups. The present invention provides such a means by opening the hindered epoxy rings of a hydrogenated diene block copolymer to introduce reactive hydroxyl functionality to the polymer backbone.

SUMMARY OF THE INVENTION

The process of the present invention is one for making elastomeric block polymers of conjugated dienes which contain hydroxyl functionality capable of reacting with curing agents, such as amino resins and isocyanates. Preferably, the final products are substantially free of residual unsaturation. The process comprises first making a precursor polymer by polymerizing at least one conjugated diene which leaves 1,2 disubstituted, 1,1 disubstituted, 1,1,2 trisubstituted or tetrasubstituted olefinic unsaturation in the polymer, epoxidizing the polymer such that 0.1 to 5 milliequivalents per gram (Meq/g) of polymer of epoxy groups form primarily at the 1,2 disubstituted, 1,1 disubstituted, trisubstituted or tetrasubstituted sites, dissolving the polymer in a suitable solvent and then reacting the epoxidized polymer with an alcohol solution of hydrochloric acid.

In a preferred embodiment, the conjugated dienes described above are copolymerized, either randomly, or in blocks, with conjugated diene monomers that leave only vinyl or 1,2 disubstituted olefinic sites. These sites are hydrogenated, either before or after epoxidation, such that the final epoxidized product contains less than 1, preferably less than 0.6 and most preferably less than 0.3, Meq/g of residual olefin. In the most preferred embodiment of this invention, polymerization is carried out such that 0.3 to 3.5 Meq/g polymer of 1,1 disubstituted, trisubstituted or tetrasubstituted olefin is present in the precursor polymer, substantially all of the vinyl and most of the 1,2 disubstituted olefins are consumed by partial hydrogenation and epoxidation is carried out to consume the remaining olefins such that no more than 0.3 Meq/g polymer of unsaturation remains in the epoxidized polymer.

The polymer of the present invention is a conjugated diene polymer containing 0.1 to 10 Meq/g polymer of hydroxyl groups. The polymer is comprised of alcohol groups of the formula

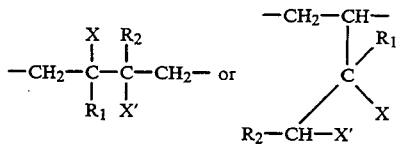

where $R_1$ and $R_2$ are hydrogen or alkyl radicals and X and X' are either —OH or —Cl and at least one of them is —OH. The polymer may also contain (a) hydrogenated diene monomer(s) which may be the diene monomer from which the alcohol units are derived or another diene monomer, (b) epoxidized diene monomer, (c) residual olefin and/or (d) lesser amounts of ether-alcohol units where one of X or X' is OR, derived from the alcohol coreagent, and the other is OH. In the most preferred embodiment, the total residual olefin is less than 1, preferably less than 0.6 and most preferably less than 0.3, Meq/g polymer.

In a preferred embodiment, sufficient alcohol is present such that 0.25 to 6 Meq/g polymer of hydroxyl groups are present. In another embodiment of the invention, hydrogenation products of a diene monomer that polymerizes to give only vinyl or 1,2 disubstituted olefin residue may also be present in the polymer. In yet another embodiment of the invention, the polymer may contain up to 75% randomly-distributed monoalkenyl aromatic hydrocarbon. The amount of such alkyl aryl monomers in an individual block of the polymer can be as high as 99% provided that sufficient conjugated diene monomer is used to give the required number of epoxidation sites.

DETAILED DESCRIPTION OF THE INVENTION SECTION

The general methods of making block copolymers are reviewed by R. P. Quirk and J. Kim, "Recent Advances in Thermoplastic Elastomer Synthesis", *Rubber Chemistry and Technology*, volume 64 No. 3 (1991), which is incorporated herein by reference. Especially useful is the method of sequential anionic polymerization of monomers. Since the types of monomers that will undergo living polymerization are relatively limited for the anionic method, with the most favorable being conjugated diolefins and styrenes, partial hydrogenation of the anionic block copolymer is normally needed to attain some of the unepoxidized polymer of the present invention. Polymers made by sequential polymerization of a suitable diolefin monomer and a monomer having only one carbon-carbon double bond or by sequential polymerization of two different mixtures (ratios) of such monomers, using either a monofunctional initiator, a monofunctional initiator and a coupling agent or a multifunctional initiator, may not have to be hydrogenated.

The polymers containing olefinic unsaturation or both aromatic and olefinic unsaturation may be prepared using anionic initiators or polymerization catalysts. Such polymers may be prepared using bulk, solution or emulsion techniques. Polymers prepared in solution are preferred for subsequent partial hydrogenation.

A very useful embodiment of this invention may be conveniently prepared by anionic polymerization, preparing blocks A and B, and optionally arm C (described below), consisting of homopolymers or copolymers of conjugated diene monomers or copolymers of conjugated diene monomers and alkyl aryl monomers (75% or less alkyl aryl monomer) wherein the monomers used for the A blocks are such that the A blocks have a greater number of 1,1 disubstituted, trisubstituted or tetrasubstituted olefinic unsaturation sites per unit of block mass than do the B blocks. The polymer may be partially hydrogenated with a suitable catalyst and conditions that favor the hydrogenation of the double bonds that are monosubstituted (vinyl) or 1,2 disubstituted (and also leaves aromatic double bonds intact), such that between about 0.2 and about 11.6 Meq/g polymer of disubstituted, trisubstituted or tetrasubstituted olefinic unsaturation sites are left intact. The B blocks, on average, will contain a lesser amount of olefinic double bonds. A special case is where A is a polyisoprene block, for which all of the residual double bonds are 1,1 disubstituted (3,4 isoprene repeat unit) or trisubstituted (1,4 isoprene repeat units), and B is a polybutadiene block, for which only monosubstituted (vinyl) or 1,2 disubstituted residual double bonds are present. Partial hydrogenation of this polymer works extremely well. When B is polybutadiene, it is often convenient to use a miniblock of oligoisoprene or oligostyrene, to improve the consistency of the coupling process when making star polymers. The polymer can be epoxidized to provide about 0.2 to about 10 milliequivalents of epoxy per gram of polymer in the A block, while the B blocks will contain a lesser amount of epoxy, due to epoxidation of residual 1,2 disubstituted olefin.

Another example would be the sequential polymerization of a single conjugated diene monomer under two sets of reaction conditions, such as the anionic polymerization of 1,3-butadiene in cyclohexane to produce 1,4-polybutadiene followed by addition of a structure modifier and an ether solvent and polymerization of high 1,2-polybutadiene, followed by coupling and selective hydrogenation of 1,2-polybutadiene to give A-B-A.

In another example, 1,1 disubstituted, trisubstituted and tetrasubstituted olefin sites can be randomly distributed among 1,2 disubstituted and vinyl olefin sites, for example, by copolymerizing butadiene and isoprene in the presence of a structure modifier and an ether solvent. Partial hydrogenation of such a polymer would allow the introduction of alcohol functionality at levels limited by the amount of the monomer that polymerizes to yield slower-hydrogenating olefin sites that was added to the polymerization feed.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls and anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

(II) $RLi_n$ wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention as required of because of their low cost and ready availability. Other conjugated diolefins which may be used in the present invention include 2-ethyl-1,3-butadiene, 2-propyl-1,3-butadiene, 2-butyl-1,3-butadiene, 2-pentyl-1,3-butadiene (2-amyl-1,3-butadiene), 2-hexyl-1,3-butadiene, 2-heptyl-1,3-butadiene, 2-octyl-1,3-butadiene, 2-nonyl-1,3-butadiene, 2-decyl-1,3-butadiene, 2-dodecyl-1,3-butadiene, 2-tetradecyl-1,3-butadiene, 2-hexadecyl-1,3-butadiene, 2-isoamyl-1,3-butadiene, 2-phenyl-1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene (myrcene), 2-methyl-1,3-nonyldiene, 2-methyl-1,3-decyldiene, and 2-methyl-1,3-dodecyldiene, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Also included are disubstituted conjugated diolefins including 2,3-dialkyl-substituted conjugated diolefins such as 2,3-dimethyl-1,3-butadiene, 2,3-diethyl-1,3-pentadiene, 2,3-dimethyl-1,3-hexadiene, 2,3-diethyl-1,3-heptadiene, 2,3-dimethyl-1,3-octadiene and the like; and 2,3-fluoro-substituted conjugated diolefins such as 2,3-difluoro-1,3-butadiene, 2,3-difluoro-1,3-pentadiene, 2,3-difluoro-1,3-hexadiene, 2,3-difluoro-1,3-heptadiene, 2,3-fluoro-1,3-octadiene and the like. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

Conjugated dienes can also be copolymerized with methacrylates, such as t-butyl methacrylate, as described in U.S. Pat. No. 5,002,676, which is incorporated herein by reference, and such copolymers can be partially hydrogenated and epoxidized as described herein. The preferred use position for methacrylates, when used in the polymer, is in the C arms which are described below.

In general, any of the solvents known in the prior art to be useful in the preparation of such polymers may be used. Suitable solvents, then, include straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0° and 100° C. using an alkyl lithium initiator. The living polymer chains are usually coupled by addition of divinyl monomer to form a star polymer. Additional monomers may or may not be added to grow more arms, C arms, or to terminally functionalize, such as with ethylene oxide or carbon dioxide to give hydroxyl or carboxyl groups, respectively, and the polymer and the living chain ends are quenched with a proton source. Polymerization may also be initiated from monomers such as m-divinylbenzene and m-diisopropenylbenzene treated with butyl lithium.

There are a wide variety of coupling agents or initiators that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. Nos. 3,595,941; 3,468,972, 3,135,716; 3,078,254; 4,096,203 and 3,594,452 which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as $(AB)_nY$. Coupling monomers are coupling agents where several monomer units are necessary for every chain end to be coupled. Divinylbenzene is the most commonly used coupling monomer and results in star polymers.

The polymers optionally may be partially hydrogenated. It may take place before or after epoxidation. Preparation of polymers which have controllable and predictable amounts of residual olefinic unsaturation is disclosed in U.S. Pat. No. 4,879,349 which is herein incorporated by reference. The process disclosed therein includes copolymerizing substituted and unsubstituted conjugated diolefins and hydrogenating the copolymer under conditions which are effective to substantially hydrogenate the olefinic unsaturation which lacks tertiary substitution (contains vinyl or 1,2 disubstitution), but leave the remaining olefinic unsaturation substantially unhydrogenated. Partial hydrogenation utilizing the process described in this patent is preferred because of the excellent controllability of the amount of residual unsaturation. It is likely that better performance will be achieved when the catalyst disclosed in the patent is replaced by a titanium catalyst such as is disclosed in U.S. Pat. No. 5,039,755 entitled "Selective Hydrogenation of Conjugated Diolefin Polymers" which is herein incorporated by reference. Further, it is likely that better performance will be achieved if the polymerization process described in that patent, utilizing termination of polymerization by hydrogen, is used herein.

In a preferred embodiment the polymers are partially hydrogenated prior to epoxidation and the A blocks contain a greater concentration of 1,1 disubstituted, 1,1,2 trisubstituted or tetrasubstituted olefinic double bonds (SDB) than the B blocks and the A blocks contain from 0.2 to 11.6 Meq/g polymer of such double bonds, preferably within the range of 0.5 to 9 Meq/g and most preferably to 1.0 to 5.4 Meq/g. Preferably, the ratio of the concentration (Meq/g) of such double bonds in A to the concentration in B should be greater than 3:1. More preferably, the ratio should be greater than 5:1 because it is generally valuable to confine functionality to blocks, particularly if it is desirable to maintain elastomeric properties after crosslinking. When the end use for the polymer is for pressure sensitive adhesives or flexible coatings, it is often useful for the B blocks to contain little or no SDB's. If polymerization placed greater amounts of double bonds in the A or B blocks, the polymer would have to be epoxidized to a greater extent to remove most of the double bonds. This leads to polymers that have water sensitivity in the A blocks, that over-crosslink, especially in the B blocks, have little elasticity and thus are unsuitable for the applications intended.

After partial hydrogenation, the glass transition temperature of polymers intended for pressure-sensitive applications should normally be less than about 10° C., preferably less than about −15° C. and most preferably less than about −40° C. Polymers with higher Tg's in the A blocks are not as soft, while polymers with higher Tg's in the B blocks are not as elastomeric. Polymers with higher Tg's in the B block may be desirable for coatings, where tack is to be avoided.

Partial hydrogenation is diene selective. Generally, the rate of hydrogenation is much greater for carbon-carbon double bonds in which neither of the carbons is tertiary, as found in mono- and 1,2 disubstituted olefins, than for carbon-carbon double bonds in which one of the carbons is a tertiary carbon, as found in 1,1 di-, 1,1,2 tri- and tetrasubstituted olefins. The rate of epoxidation of carbon-carbon double bonds is just the opposite. Tertiary carbons promote epoxidation with peroxyacids better than secondary carbons, which in turn are better than primary carbons. Thus, the polymers described are especially suitable for the processes of partial hydrogenation or epoxidation and are especially suitable for the sequential use of both processes on the polymer. Use of partial hydrogenation alone on the present polymers preferentially leaves a greater number per unit of weight of residual diene double bonds in the A blocks of the polymers, while use of epoxidation alone produces a greater number of epoxidized diene monomers per unit of block weight in the A blocks than the B blocks. Epoxidation is also selective, favoring the disubstituted, trisubstituted and tetrasubstituted olefins and the resulting epoxies are resistant to hydrogenation, so that saturated polymers can also be made by hydrogenation of the less substituted-olefins following epoxidation.

Whether or not the polymer is to be hydrogenated, it must be epoxidized such that at least 0.1 Meq/g polymer of epoxy is in the polymer or there will be insufficient functionality to provide sufficient hydroxyl groups to provide the advantages of the invention. The preferred range is 0.1 to 5 Meq/g and most preferred is 0.25 to 3 Meq/g.

The epoxidized copolymers can be prepared by the epoxidation procedures as generally described or reviewed in the *Encyclopedia of Chemical Technology* 19, 3rd ed., 251–266 (1980), D. N. Schulz, S. R. Turner, and M. A. Golub, *Rubber Chemistry and Technology*, 5, 809 (1982), W-K. Huang, G-H. Hsuie, and W-H. Hou, *Journal of Polymer Science, Part A: Polymer Chemistry*, 26, 1867 (1988), K. A. Jorgensen, *Chemical Reviews*, 89, 431 (1989) and Hermann, Fischer and Marz, *Agnew. Chem. Inst Ed. Engl.* 30 (No. 12), 1638 (1991), all of which are incorporated by reference.

For instance, epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight carboxylic acid such as formic acid. Alternatively, hydrogen peroxide in the presence of acetic acid or hydrogen peroxide in the presence of acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylene chloride and the like and epoxidation conducted in this new solution or the polymer can be epoxidized neat. Epoxidation temperatures on the order of 0° to 130° C. and reaction times from 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may also result in diolefin polymer blocks containing both epoxide and hydroxy-ester groups. Due to these side reactions caused by the presence of an acid, it is preferable to carry out the epoxidation at the lowest possible temperature and for the shortest time consistent with the desired degree of epoxidation. Epoxidation may also be accomplished by treatment of the polymer with hydroperoxides or oxygen in the presence of transition metals such as Mo, W, Cr, V and Ag.

Epoxidized and optionally selectively hydrogenated polymers useful in the process of the present invention to manufacture the hydroxyl-containing polymers of the present invention are described in copending, commonly assigned U.S. patent applications Ser. No. 692,839, filed Apr. 29, 1991, now U.S. Pat. No. 5,229,464 Ser. No. 772,172 filed Oct. 7, 1991, and Ser. No. 863,579, "Epoxidized Elastomers for Exterior Block Crosslinking," filed concurrently herewith. Methods for making such polymers are described in detail in the above mentioned patent applications, which are herein incorporated by reference.

The last step of the process of the present invention involves reacting a solution of the epoxidized polymer with an alcohol solution of hydrochloric acid. The polymers of the present invention, elastomeric block polymers of conjugated dienes which contain reactive hydroxyl functionality in the diene blocks, are produced.

It is preferred that the alcohol solution of hydrochloric acid be prepared by adding an aqueous solution of hydrochloric acid, for example 37% (by weight) aqueous hydrochloric acid (ACS Concentrated Reagent), to the alcohol such that from 0.01 to 1 gram of HCl will be present per gram of polymer. At least one equivalent of HCl must be present per equivalent of epoxy functionality. To ensure rapid reaction, it is most preferred that at least 5 moles of acid be present per mole of epoxy. It is further preferred that this acid solution be added to the alcohol in a 1:2 to 1:10, preferably 1:5 to 1:6, volume ratio because sufficient alcohol must be present to ensure reaction with the polymer in the organic phase. Suitable alcohols include 1 to 4 carbon alcohols such as methanol, ethanol, n-propanol, isopropanol, n-butanol and sec-butanol, with methanol being most preferred. More dilute hydrochloric acid solutions may be used to prepare the alcohol solution but too little acid will result in sluggish reactions, as will too high a ratio of water to alcohol in the reagent solution. Too high an acid concentration may result in side reactions leading to crosslinking. Gaseous hydrochloric acid may be used to prepare the alcohol reagent solution.

The concentration of the epoxidized polymer in solution is also important. It may range from as little as 1 percent up to 30 weight percent. Higher solids levels encourage the formation of coupled (dimeric, trimeric, etc.) polymers due to intermolecular reactions of epoxy groups. Lower levels, from 10 to 20 percent, are preferred, with 10% being most preferred, because this minimizes coupling. The increase in coupling with increasing solids is greatest for high molecular weight linear polymers but is less for star polymers possessing relatively short (3,000 to 10,000 molecular weight) arms. Suitable solvents include any solvent in which the polymer is soluble, however, hydrocarbon solvents (aromatic and aliphatic) are preferred, with cyclohexane being most preferred. The use of polar solvents, such as tetrahydrofuran, may lead to emulsion problems, since it is preferred that the residual acid be removed from the derivatized polymer cement by water washing. It is also preferred that the alcohol reagent solution be added to the polymer cement in ratio of about 1:1 to 1:10, preferably 1:5 to 1:6 because addition in this ratio assures that enough alcohol will be present to facilitate reaction with the polymer in the organic phase.

This reaction can be carried out at a temperature from 20° C. to 100° C. The preferred range is from 25° C. to 50° C. Lower temperatures will decrease the reaction rate and higher temperatures may result in side reactions, such as crosslinking. The maximum reaction temperature will also be limited by the boiling point of the alcohol. It is preferred that the reaction be carried out below the reflux temperature of the solution. The process can be carried out for a period of from 15 minutes to 24 hours after the addition of the HCl, but, in almost all cases, only 15 to 60 minutes (following the complete addition of HCl solution) will be required to achieve substantially complete hydrolysis.

The use of hydrochloric acid is necessary as it is the most practical mineral acid reagent capable of providing efficient hydrolysis under the preferred reaction conditions described above. Although perchloric acid may produce substantial hydrolysis, the hazards associated with its handling are undesirable. Reactions in which sulfuric acid is substituted for hydrochloric acid in this invention or for perchloric acid in the process of U.S. Pat. No. 3,555,112 suffer from competitive crosslinking and soluble polymers containing substantial levels of alcohol functionality are not obtained. In addition, the acid catalyst is difficult to remove or neutralize, resulting in discoloration of the product when it is dried. Reactions employing strong organic acids, including alkyl and aryl sulfonic acids, suffer from similar problems. Other halogen acids, such as hydrobromic (HBr) or hydriodic (HI) acid, may effect reaction to high conversion, but even traces of these acids and their salts are known to impart color to the product, especially when aged at elevated temperatures. This discoloration would be detrimental in many of the intended applications, especially in clear coatings.

A significant number of the alcohol - containing repeat units resulting from the process of this invention are expected to be chlorohydrins. One of X or X' in formula (I) is Cl and the other is OH. Treatment with strong base may result in regeneration of the epoxide by dehydrohalogenation, but in most cases, the presence of chlorine adjacent to the hydroxyl group will not limit the utility of the product.

The polymers of the present invention are generally described above. If less than 0.1 Meq/g polymer of hydroxyl groups are present, there is insufficient functionality to achieve the advantages of the invention. More than 10 Meq/g can cause the polymer to be too water soluble and brittle after cure. A range of 0.25 to 6 Meq/g is preferred.

One preferred type of polymer within the scope of the present invention is a conjugated diene block polymer containing hydroxyl functionality and having the formula (III) $C_q\!-\!Y_p\!-\!(B_x\!-\!A)_r$ where B is a block comprising hydrogenated conjugated diene, preferably butadiene, derived repeat units and x is 0 or 1. The B block may also contain low levels of epoxidized, alcohol-containing and/or unsaturated repeat units, subject to the limitation that no more than 1, preferably no more than 0.6 and most preferably no more than 0.3, Meq/g polymer of unsaturated double bonds remains in the polymer—all the B blocks described hereafter may also contain such units. A is a polymer block containing alcohol units of formula (I) in the Summary Section. The A block may also contain hydrogenated or epoxidized and/or unsaturated repeat units such that no more than 1, preferably 0.6 and most preferably 0.3, Meq/g polymer of unsaturated double bonds remains in the polymer (all the A blocks described hereafter may contain such units). C is A, B and/or methacrylate or mixtures thereof and Y is a coupling agent or coupling monomers or initiator. From 0.1 to 10 Meq/g polymer, preferably 0.25 to 5 Meq/g, of hydroxyl groups are present in the polymer, and $r>0$, $q\geq 0$, $r+q$ is from 1 to 100 and p is 0 or 1.

Still another preferred embodiment of the present invention has the formula (IV) $S_{z'}\!-\!A\!-\!S_z$ wherein S is a block consisting of monoalkenyl aromatic hydrocarbon and z and z' are 0 or 1. A is a polymer block comprising alcohol units of formula (I) in the Summary Section. A may also contain epoxidized diene monomer, hydrogenated diene monomer which may be a different diene monomer than that from which the alcohol units are derived, monoalkeny aromatic hydrocarbon and unhydrogenated diene monomer residues as described previously. Alcohol units are present in an amount such that 0.1 to 10 Meq/g polymer, preferably from 0.25 to 6 Meq/g, of hydroxyl groups are present in the polymer. In a preferred embodiment of this invention, the A block consists of a copolymer of isoprene and butadiene and the majority of alcohol units are derived from isoprene.

Also included herein are block polymers of the formula (V) $S_{z'}\!-\!A\!-\!S_z$ wherein S and A are as described in the preceding paragraph but the blocks are not hydrogenated. Another unhydrogenated polymer which falls within the scope of the present invention has the formula (VI) $C_qY_p$—$(B_x$—$A)_r$ wherein B is a polymer block derived from a diene and A is a polymer block which contains a higher concentration of alcohol units than B and the rest of the terms are as described in formula (III) above. For all of the polymers above it is preferred that B be derived from butadiene and A be derived from isoprene, that the amount of hydroxyl groups range from 0.25 to 6 Meq/g polymer. In another embodiment, the polymer contains up to 75% of a vinyl aromatic hydrocarbon.

The molecular weights of these polymers generally range from $2 \times 10^3$ to $5 \times 10^6$. The molecular weights of the A blocks generally range from 100 to 50,000, with 500 to 15,000 being most preferred. The molecular weights of the B blocks generally range from 100 to 200,000, with 13,000 to 50,000 being most preferred. The molecular weights of the C blocks generally range from 50 to 100,000, with 500 to 50,000 being most preferred. The molecular weight of the S blocks generally range from 100 to 50,000. In order to produce polymers having these molecular weights, the precursor polymers must be made so that the molecular weights thereof are similar. Some higher molecular weight species formed by coupling during the reaction with HCl may also be present.

Molecular weights of linear polymers or uncoupled linear segments of polymers such as mono-, di-, triblock, and etc., or arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, M. W. Yau, J. J. Kirkland, D. D. Bly, John Wiley & Sons, New York, N.Y., 1979.
2. *Light Scattering from Polymer Solutions*, M. B. Huglin, ed., Academic Press, New York, N.Y. 1972.
3. W. Kay and A. J. Havlik, *Applied Optics*, 12, 541 (1973).
4. M. L. McConnell, *American Laboratory*, 63, May, 1978.

These polymers are intended for uses requiring functionality to add polarity and reactivity to the unfunctionalized molecules. In particular, these molecules are intended as rubber modifiers and vehicle constituents in coatings and sealants, especially polyurethane coatings and sealants. These products are useful in thermoset adhesives, sealants and coatings, especially the urethanes, polyesters and melamine-curing products. These polymers are also useful in asphalt modification where polarity is desirable. They are useful in fibers, films and printing plates, as well as for the modification of polyesters, polyethers and polyamides. Reaction of these hydroxyl group-containing polymers with molecules containing electrophilic functional groups such as isocyanates, acid chlorides, carboxylic acids, etc., can be used to introduce new functionality to the polymer backbone. For example, acrylate groups can be introduced by reaction with methacrylic acid and isocyanate groups by reaction with excess toluene diisocyanate.

The polymers of the present invention are especially useful in coatings. Preferably, these polymers are crosslinked with isocyanate to create excellent coating materials. Isocyanate is used to crosslink the polymers via reaction with the hydroxyl functionality present in the polymer. Standard polyurethane chemistry is utilized for the reaction of the polymer with the isocyanate. For example, see "Coatings Based on Polyurethane Chemistry: An Overview and Recent Developments" by T. A. Potter and J. L. Williams, *Journal of Coatings Technology*, Vol. 59, No. 749, June 1987, pps. 63–72, which is herein incorporated by reference. Monomeric isocyanates can be used for the crosslinking of functionalized polymers. Monomeric isocyanates suffer from the disadvantage that they are highly toxic. In order to reduce the problems caused by using such materials, isocyanate adducts are often used in place of the monomeric isocyanates. Both types have the advantage that the reaction will take place at room temperature. It is also possible to use blocked isocyanates. Isocyanates are blocked by reaction with a volatile hydroxy material in order to keep them from reacting with the hydroxy functionalized block polymer. The isocyanate is regenerated when heat is applied. This is described in the article referred to above. Such blocked isocyanates are useful, for example, in baked coatings. The material will be coated onto a substrate which will then be heated. The blocking agent will leave the coating under the influence of heat and crosslinking of the hydroxy functionalized block polymer will take place.

These polymers may also be crosslinked and cured with amino resins and anhydrides. For instance, see *50 Years of Amino Coating Resins*, edited and written by Albert J. Kirsch, published in 1986 by American Cyanamid Company, which describes in detail a whole series of amino resins which are useful in the present invention. It is stated therein on page 20 that the backbone polymers, i.e., the polymers which are to be crosslinked, "must contain one or more of the functional groups—hydroxy, carboxy, amide —listed above to be useful with amino resins". The foregoing publication is herein incorporated by reference. Anhydrides are used to cure OH groups in baked coatings (heating with phthalic anhydride, for example).

The crosslinked materials of the present invention are useful in adhesives, sealants, coatings, films (such as those requiring heat and solvent resistance), etc. In addition to the hydroxy-functionalized polymer and any curing aids or agents, products formulated to meet performance requirements for particular applications may include various combinations of the following types of ingredients.

Resin

In many applications, especially in adhesives and sealants, it may be necessary to add an adhesion promoting or tack,lying resin that is compatible with the rubbery midblock of the polymer. A common tackifying resin is a diene-olefin copolymer of piperylene and 2-methyl-2-butene having a softening point of 95° C. This resin is available commercially under the tradename Wingtack ® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20-80 weight percent of piperylene and 80-20 weight percent of 2-methyl-2-butene. The resins normally have softening points (ring and ball) between 80° C. and 115° C.

Other adhesion promoting resins which are also useful include hydrogenated rosins, esters of rosins, polyterpenes, terpenephenol resins and polymerized mixed olefins, lower softening point resins and liquid resins. Examples of low softening point or liquid resins include Adtac ® LV, Piccolastic A5, Piccovar AP10, and Piccolyte S25 resins from Hercules. To obtain good thermo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethyl styrene resin such as Regalrez ® resin made by Hercules. The amount of adhesion promoting resin employed varies from 10 to 400 parts by weight per hundred parts rubber (phr), preferably between 20 to 350 phr. The selection of the particular tackifying agent is, in large part, dependent upon the specific polymer employed in the respective adhesive composition.

Optionally, an arene-block-compatible resin may be employed. Compatibility is judged by the method disclosed in U.S. Pat. No. 3,917,607. Normally, the resin should have a softening point above 100° C., as determined by ASTM method E 28, using a ring and ball apparatus. Mixtures of arene block-compatible resins having high and low softening points may also be used. Useful resins include coumaroneindene resins, polystyrene resins, vinyl toluene-alphamethylstyrene copolymers, and polyindene resins. Much preferred is a coumarone-indene resin. The amount of arene-block-compatible resin varies from 0 to 200 phr.

Plasticizer

An adhesive composition may contain plasticizers, such as rubber extending plasticizers, or compounding oils. Rubber compounding oils are well-known in the art and include both high saturates content oils and high aromatics content oils. Preferred plasticizers are highly saturated oils, e.g. Tufflo ® 6056 and 6204 oil made by Lyondell and process oils, e.g. Shellflex ® 371 oil made by Shell. Higher aromatic content oils include Tufflo ® 11 and Shellflex ® 212. The amounts of rubber compounding oil employed in the invention composition can vary from 0 to 500 phr, preferably 0 to 100 phr, and most preferably between 0 and 60 phr.

Filler

Various types of fillers and pigments can be included in the coating formulation. This is especially true for exterior coatings in which fillers are added not only to create the desired appeal but also to improve the performance of the coating such as its weatherability. A wide variety of fillers can be used. Suitable fillers include calcium carbonate, clays, talcs, zinc oxide, titanium dioxide and the like. The amount of filler usually is in the range of 0 to 70%w based on the solvent free portion of the coating, depending on the type of filler used and the application for which the coating is intended. An especially preferred filler is titanium dioxide.

Solvent

If the coating will be applied from solvent solution, the organic portion of the coating will be dissolved in a solvent or blend of solvents. Aromatic hydrocarbon solvents such as toluene, xylene, or Shell Cyclo Sol 53 are suitable. If desired, it is usually possible to obtain lower viscosity by using a solvent blend consisting of an aromatic hydrocarbon solvent with a polar solvent. Suitable polar solvents include esters such as isopropyl acetate, ketones such as methyl isobutyl ketone, and alcohols such as isopropyl alcohol. The amount of polar solvent used depends on the particular polar solvent chosen and on the level of functionality on the functionalized hydrogenated block copolymer. Usually, the amount of polar solvent used is from 0 to 50%w in the solvent blend.

Stabilizer

Antioxidants and UV inhibitors can be added to the formulations to protect the products against degradation by oxidation or by exposure to sunlight during preparation and use of the compositions. Combinations of stabilizers are often more effective, due to the different mechanisms of degradation to which various polymers are subject.

The primary component of the antioxidant portion of the stabilizer package will be a hindered phenol type antioxidant. Examples of commercially available antioxidants of this type are ETHANOX 330 (from Ethyl Corporation), CYANOX 2246 (from American Cyanamid) and IRGANOX 1010 (from Ciba Geigy). A wide variety of secondary antioxidants and synergists can also be included in the formulation. Examples include zinc dialkyl dithiocarbamates such as BUTYL ZIMATE (from Vanderbilt), phosphite esters such as WESTIN 618 (from General Electric), and sulfur bearing compounds such as dilaurylthio-dipropionate, CYANOX LTDP (from American Cyanamid), Antioxidants are usually used in the formulation at concentrations from 0.05%w to 5%w.

The UV inhibitor portion of the stabilizer package will usually be composed of a combination of a UV light absorbing type compound and a hindered amine light stabilizer. Typical absorbing type UV inhibitors include the benzophenone type such as CYASORB UV 531 (from American Cyanamid) and the benzotriazole type such as TINUVIN P and TINUVIN 328 (both from Ciba Geigy). Typical hindered amine light stabilizers include TINUVIN 770 (from Ciba Geigy) and SANDUVOR 3056 (from American Cyanamid). UV inhibitors which contain a metal, such as the nickel containing UV inhibitor, CYASORB UV 1084 (from American Cyanamid) can also be used. These UV inhibitors will generally be included in the formulation at concentrations from 0.05%w to 10%w.

Protective pigments and fillers can also improve the resistance to degradation by exposure to sunlight. Examples include carbon black, zinc oxide and titanium dioxide.

Compositions of the present invention are typically prepared by blending the components at an elevated temperature, preferably between 50° C. and 200° C., until a homogeneous blend is obtained, usually less than three (3) hours. Various methods of blending are known to the art and any method that produces a homogeneous blend is satisfactory. The resultant compositions may then preferably be used in a wide variety of applications. Alternatively, the ingredients may be blended into a solvent.

Adhesive compositions containing the polymers of the present invention may be utilized as many different kinds of adhesives, for example, laminating adhesives flexible packaging laminating adhesives, contact adhesives, assembly adhesives, pressure sensitive adhesives, tie layers, hot melt adhesives, solvent borne adhesives and waterborne adhesives in which the water has been removed before curing. The adhesive can consist of simply the hydroxyl-functionalized polymer or, more commonly, a formulated composition containing a significant portion of the hydroxyl-functionalized polymer along with other known adhesive composition components, and, possibly, a crosslinking agent. The incorporation of alcohols in epoxy formulations intended for cationic cure has been observed to increase the cure rate; a preferred composition for cationic cure contains both hydroxyl-functionalized and epoxidized polymer. Cationic cure may be initiated by E-beam radiation or UV light in the presence of appropriate photoinitiators or by thermally-activated initiators.

EXAMPLES

Example 1

The precursor polymer was an unsaturated linear polystyrene(butadiene/isoprene)-polystyrene block copolymer having a peak molecular weight of 50,000 and a styrene content of 30%, in which about 1.5 Meq/g of isoprene units were randomly placed within the midblock. The polymer was partially hydrogenated such that 1.2 Meq of olefinic double bonds remained in the polymer. The partial hydrogenation was carried out as follows: Polymer in cyclohexane was reacted with a catalyst prepared by reacting nickel 2-ethylhexanoate with triethyl aluminum (about 2.3 moles of Al per mole of Ni) and hydrogen at 500 psi, at a temperature of 10° C. About 13 ppm of Ni (b $1.8 \times 10^{-3}$ mole per gram of polymer) was used. The catalyst and residual lithium were washed out. The polymer was then epoxidized by reaction with peracetic acid at about 45° C., acid was added over about 60 minutes and then the solution was held at 45° C. for about 6 hours. About 1 Meq of peracetic acid per Meq of residual olefin in the polymer was added. The acetic and residual peracetic acid were neutralized and the polymer solution was thoroughly washed with water. The epoxidized polymer contained 0.85 Meq epoxy per gram of polymer.

10 grams of epoxidized polymer were dissolved in 100 grams of cyclohexane. 24 mL of a solution consisting of a 5:1 volume ratio of methanol and concentrated HCl (37% aqueous, ACS Concentrated Reagent 0.17 g/g polymer) was added. The solution was stirred, either at room temperature or about 50° C. for the desired time (15 minutes to 6 hours). Small samples for $^1$H NMR and FTIR were taken after regular intervals. The reaction mixture was cooled and the cement was washed with water. The polymer was isolated by precipitation into isopropanol and then dried under vacuum at 50° C. A white, soluble product was obtained.

The analytical results are summarized in Table 1. Titration for residual epoxy was performed by the widely used method of adding a solution of tetraethyl ammonium bromide (TEABr) in acetic acid and titrating the acetate produced, by reaction of the epoxy groups, with standardized perchloric acid. The extent of conversion of epoxy groups to the alcohol groups could be inferred from the decrease in epoxy functionality following reaction. $^1$H NMR revealed resonances identified as due to protons on the carbon containing the hydroxyl (H—C—OH) or chlorine (H—C—Cl-)—the protons appear in the same region. Resonances due to epoxy were almost completely absent and calculations indicate about 96% reaction. $^1$H NMR spectra of samples taken at 15 and 30 minutes reveal that the reaction was essentially complete in the first 15 minutes. The Fourier Transform Infrared (FTIR) spectra, as expected, exhibited intense resonances at 3450 cm$^{-1}$ (hydrogen bonded OH) and weaker bands at 3580 cm$^{-1}$ (monomeric OH) and at 1070 & 1030 cm$^{-1}$ (C—OH band). No new resonances in the C—Cl (800–600 cm$^{-1}$) region, indicative of the presence of chlorohydrin, could be identified. However, such resonances may be buried in an intense broad absorbence at about 750 cm$^{-1}$, present in the starting polymer. No ether C—O—C bands were observed. This evidence suggests that most, if not all, of the derivatized repeat units are diols (the product of adding water) or chlorohydrins (the product of adding HCl) and not ether-alcohols (the product of adding methanol). This evidence does not rule out the presence of some methoxy-alcohol repeat units. Washing with water alone or with aqueous sodium carbonate seemed to give the same structure.

Examination of Table 1 reveals that epoxy groups were consumed very rapidly and reaction appears to be essentially complete after 15 minutes at 50° C. These results are in contrast to the examples of U.S. Pat. No. 3,555,112 where about 50% or more of the epoxy groups remained intact after 6 hours at 50° C.

TABLE 1

| Temp. | Time | $^1$H NMR (Meq/g) | | | Titration (Meq/g) | | |
|---|---|---|---|---|---|---|---|
| | | E | DE | % Rxn$^a$ | E | DE | % Rxn$^b$ |
| room | 15 min. | .94 | .13 | 12 | — | — | — |
| room | 30 min. | .74 | .26 | 26 | — | — | — |
| room | 60 min. | .72 | .36 | 33 | — | — | — |
| room | 2 hrs. | .59 | .51 | 46 | — | — | — |
| room | 6 hrs. | .36 | .82 | 69 | .34 | .51 | 60 |
| 50° C. | 15 min. | .04 | .94 | 96 | — | — | — |
| 50° C. | 30 min. | <.01 | .95 | 100 | — | — | — |
| 50° C. | 60 min. | <.01 | .92 | 100 | .04 | .81 | 95 |

Initial Epoxy Concentrations ($E_{int}$) = 0.85 Meq/g
$^a$100 × DE/(DE + E)
$^b$100 × ($E_{int}$ − E)/$E_{int}$

Example 2

This example reports the results of using the process of the present invention on a molecule specifically designed to meet coatings requirements. For coatings in which the polymer is intended to be a vehicle constituent rather than a modifier, the polymer should have a low viscosity (pourable at or near room temperature) and a high enough $T_g$ to produce a relatively hard coating, as well as possess sufficient polarity to impart reasonable compatibility with polar co-reagents, such as isocyanates for example, and solvents.

The polymer used in this example is a star polymer of the following structure:

Where DVB is divinylbenzene (the coupling agent) and EB is ethylene/butylene (hydrogenated butadiene), eI is epoxidized isoprene and n is 15 to 20. Each of the n arms has a molecular weight of 5,100 and the overall molecular weight is approximately 88,000. The unsaturated precursor was prepared by polymerizing short (4–6 repeat units) isoprene blocks and then adding butadiene and styrene in the presence of a randomizing agent to produce a block comprised of a random mixture of about 50% of each monomer. The arms were then coupled with DVB. The polymer was then partially hydrogenated and epoxidized, as described above, to introduce about 0.65 Meq/g of epoxy functionality, primarily in the isoprene blocks.

This polymer was hydrolyzed as described in Example 1. The analytical results are summarized in Table 2. As in the previous example, the spectroscopic evidence was most consistent with hydrolysis of the epoxy groups to diols and/or addition of HCl to form chlorohydrin. The results summarized in Table 2 indicate that this polymer was more difficult to hydrolyze than the linear polymer of Example 1. However, it is clear that substantial conversion occurs in the preferred reaction time of one hour.

TABLE 2

| Temp. | Time | $^1$NMR (Meq/g) | | | Titration (Meq/g) | | |
|---|---|---|---|---|---|---|---|
| | | E[c] | DE | % Rxn[a] | E | DE | % Rxn[b] |
| room | 15 min. | .51 | .15 | 23 | — | — | — |
| room | 30 min. | .44 | .22 | 33 | .33 | .33 | 50 |
| 50° C. | 15 min. | .25 | .39 | 59 | — | — | — |
| 50° C. | 30 min. | .21 | .44 | 67 | .09 | .57 | 86 |
| 50° C.[d] | 2 hrs. | .14 | .50 | 78 | .06 | .59 | 90 |

Initial Epoxy Concentrations ($E_{int}$) = 0.65 Meq/g
[a] $100 \times DE/(DE + E)$
[b] $100 \times (E_{int} - E)/E_{int}$
[c] $E = .65 - DE$
[d] 300 g of polymer Example 3

In this example, 10 grams of the epoxidized polymer of Example 1 were dissolved in 100 grams of cyclohexane. 24 mL of a solution consisting of a 5:1 volume ratio of methanol and concentrated sulfuric acid (96% aqueous, ACS Concentrated Reagent) were added. The solution was stirred at room temperature for the 360 minutes. Small samples for NMR and FTIR were taken after 15, 30 and 60 minute intervals. The cement was washed with deionized water. The polymer was isolated by precipitation into isopropanol and then dried under vacuum at 50° C. The samples exhibited increasing crosslinking with reaction time. Samples taken during the first 60 minutes appeared to be in solution, but would not dissolve, only swell, after precipitation. The reaction mixture had set-up to form a loose gel by the time that 360 minutes had elapsed. When the polymer was dried overnight, discoloration was evident. Washing the cement with dilute aqueous sodium carbonate and then water, prior to precipitation had no effect on the product. Crosslinking and discoloration were still observed.

Example 4

The experiment described in Example 3 was repeated using 37% (by weight) aqueous sulfuric acid in place of the concentrated reagent. A sample was taken after 15 minutes and the remaining product was isolated after 60 minutes. Gel formation was still evident, although the crosslinking appeared less extensive. The isopropanol precipitates were swollen in toluene and cast onto NaCl plates for FTIR. After drying at 40° C. under vacuum, the spectra were recorded. In contrast to the results of the reaction with HCl, the FTIR spectra exhibited little evidence of reaction.

Example 5

Soluble alcohol derivatives of the polymer of Example 1 could be prepared using sulfuric acid and alkane and arene sulfonic acids if large amounts of water were present, as described in the examples in U.S. Pat. No. 3,607,982, and very low acid levels (5 to 20 mole % of the epoxy groups) were used. The reactions were carried out as follows. 25 grams of the polymer of Example 1 was dissolved to a concentration of 10 wt % in a 25:75 volume ratio mixture of isopropanol and toluene. About 13 grams of water, followed by the desired amount of the acid catalyst (in 20 mL of isopropanol) was added and the reaction was heated with stirring at 50° C. for the desired time. The polymers were isolated by precipitation into isopropanol, redissolved to 10 wt % in toluene and washed with dilute aqueous sodium carbonate, followed by water. The polymers were then precipitated in isopropanol and dried at 50° C. under vacuum. The reaction conditions and results are summarized in Table 3.

Conversion, even after 5 hours, was very low when sulfuric acid was used as the catalyst. Higher levels of methanesulfonic acid (MSA) also gave substantial conversion only after very long reaction times. Higher conversions could be obtained using dodecylbenzene sulfonic acid (Cycat 600, purchased from American Cyanamid as a 72% wt. solution in isopropanol). However, this catalyst was very difficult to wash out of the polymer and residues often catalyzed crosslinking when the polymer was dried. Soluble polymer could be reliably obtained only by adding a sufficient quantity of a non-volatile base, such as diisopropanolamine, to neutralize the catalyst. The resulting salt could not be removed and constituted a significant percentage of the isolated product. At higher reaction temperatures, crosslinking, leading to gel formation, was competitive with hydrolysis. As a result, higher reaction to temperatures were found to be undesirable.

TABLE 3

| Time | HA | [HA][a] | % hydrolysis[b] |
|---|---|---|---|
| 5 hrs. | $H_2SO_4$ | 0.006 | 26 |
| 24 hrs. | MSA | 0.02 | 60 |
| 5 hrs. | Cycat 600 | 0.014 | 47 |
| 24 hrs. | Cycat 600 | 0.05 | 80 |

[a] grams acid/gram polymer
[b] by titration

Example 6

The HCl-hydrolyzed polymer of Example 2 was cured with an amino resin according to the following procedure. Polymer was mixed with a hexamethoxymethyl melamine (Cymel 303, American Cyanamid) and an arenesulfonic acid catalyst (Cycat 600, American Cyanamid) in a 90/10 mixture of xylene/n-butanol. Compositions were prepared containing the amino resin at about 4%, 9%, 16% and 28% of the total solids. 0.1 gram of catalyst was added for every gram of amino resin. About 0.5 to 2 mil films were drawn onto steel and aluminum panels and these were baked at 1) 150° C. for 20 minutes or 2) 200° C. for 10 minutes. Controls were prepared by casting films of the polymer and 1% (wt. solids) Cycat 600.

After baking, all of the melamine-cured films were clear, glossy and hard. Films baked at 200° C. were slightly yellow, while films baked at 150° C. were colorless. The control films were both quite colored, soft, and tacky. Although formulations made with Cycat 600 alone and the melamine-containing formulations were completely crosslinked, it was clear that the properties of the films without melamine were substantially poorer.

Physical testing data for those films are summarized in Table 4. Scratch (S) and gouge (G) pencil hardness was determined using the standard method of drawing successively harder leads across the coating until it was scratched or gouged, respectively. The MEK (methyl ethyl ketone) rub test was performed according to the standard method of drawing an MEK-moistened cloth across the coating 200 times, or until breakthrough to the substrate occurred. Crosshatch adhesion testing was performed according to the standard method of cutting a crosshatch pattern and contacting with a pressure sensitive tape. The amount of the coating lifted off determines the rating. Ratings are from 0-5 with 5 representing no coating lifted and 0 representing removal of greater than 65% of the coating.

As can be seen from Table 4, the hardness was very good, especially for coatings containing the highest level of the amino resins. The MEK rub test clearly shows that the extent of curing related to the melamine level. Highly cured (tightly crosslinked) coatings were obtained at the highest melamine level. Adhesion, in most cases, was less than optimal, but clearly better for the high-melamine formulations. Use of resins such as Cymel 1125 (which contains carboxylic acid functionality) or carboxylic acid-containing co-reagents may further improve adhesion. The coatings developed useful properties at well within the manufacturer's recommended levels of 15-30% melamine for general metal finishes. The hardness, clarity and gloss indicate that these materials have excellent potential in amino resin-cured coatings.

TABLE 4

| Melamine Level | Cure Schedule | Hardness$^a$ S | Hardness$^a$ G | MEK Rub | Crosshatch Adhesion |
|---|---|---|---|---|---|
| 3.8% | 1 | HB | F | 32 | 0 |
| 9.0% | 1 | F | H | 32 | 0 |
| 16.4% | 1 | F | H | 44 | 0 |
| 27.7% | 1 | H | 2H | 200+ | 1 |
| 3.8% | 2 | HB | F | 32 | 5 |
| 9.0% | 2 | H | 2H | 44 | 0 |
| 16.4% | 2 | F | H | 40 | 0 |
| 27.7% | 2 | 5H | 6H | 200+ | 5 |

Cure Schedule
1) 150° C., 20 min.
2) 200° C., 10 min.
$^a$6B < 5B < 4B < 3B < 2B < B < HB < F < H < 2H < 3H < 4H < 5H < 6H

We claim:

1. An unhydrogenated conjugated diene block polymer containing hydroxyl groups and having the formula $$(A_n\text{---}B)_q\text{---}Y_p\text{---}(A\text{---}B\text{---}A)_r$$

where B is a block comprising conjugated diene monomer, said block having a molecular weight of from 3000 to 7000. and x is 0 or 1, and wherein A is a polymer block having a molecular weight of from 600 to 1200 and containing a higher concentration of alcohol units than B, said alcohol units having the formula

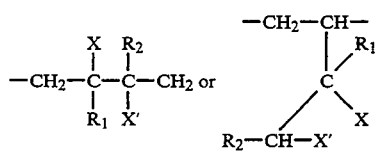

wherein $R_1$ and $R_2$ are hydrogen or alkyl radicals and X and X' are either —OH or —Cl and at least one of them is —OH, and wherein Y is a coupling agent or coupling monomers or initiator, and wherein less than 1 Meq/g polymer of hydroxyl groups is present in the polymer, r>0, q≧0, r+q is from 1 to 100 and n and p are 0 or 1.

2. The polymer of claim 1 wherein the polymer contains up to 75% of a vinyl aromatic hydrocarbon.

3. The polymer of claim 1 wherein A is primarily derived from isoprene and B primarily is comprised of butadiene repeat units.

* * * * *